United States Patent
Armstrong et al.

(10) Patent No.: US 9,755,700 B2
(45) Date of Patent: Sep. 5, 2017

(54) AUTHENTICATION FOR NEAR FIELD COMMUNICATIONS

(71) Applicant: International Business Machines Corporation, Armonk, NY (US)

(72) Inventors: Andrew A. Armstrong, Chandlers Ford (GB); Christopher Phillips, Southampton (GB); Matthew Whitbourne, Horndean (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 13/867,240

(22) Filed: Apr. 22, 2013

(65) Prior Publication Data

US 2013/0309969 A1    Nov. 21, 2013

(30) Foreign Application Priority Data

May 16, 2012    (GB) .................................. 1208604.7

(51) Int. Cl.
*H04B 5/00*    (2006.01)
*G06F 21/31*    (2013.01)
(Continued)

(52) U.S. Cl.
CPC ........... *H04B 5/0056* (2013.01); *G06F 3/017* (2013.01); *G06F 21/30* (2013.01); *G06F 21/31* (2013.01)

(58) Field of Classification Search
CPC  G06K 7/0008; G06K 19/0723; H04L 9/3226; H04L 63/08; H04L 63/083;
(Continued)

(56) References Cited

U.S. PATENT DOCUMENTS 4,974,485 A  * 12/1990  Nagai ...................... G10H 7/04
                                                         84/201
7,366,478 B2 *  4/2008  Kerth et al. .................... 455/75
(Continued)

FOREIGN PATENT DOCUMENTS

| CN | 101595495 A | 12/2009 |
|---|---|---|
| CN | 101957924 A | 1/2011 |
| WO | 2012012468 A1 | 1/2012 |

OTHER PUBLICATIONS

G. Madlmayr et al., "NFC Devices: Security and Privacy," The Third International Conference on Availability, Reliability and Security, IEEE Computer Society, 2008, pp. 642-647.

*Primary Examiner* — Devan Sandiford
(74) *Attorney, Agent, or Firm* — Cantor Colburn LLP; Damion Josephs

(57) ABSTRACT

Methods, computer program products, and systems for use in near field communications systems for authenticating at a near field communications receiver, a user of a near field communications transmitter. The system includes a data receiver for receiving a signal comprising a first unique identifier from a near field communications transmitter. The system also includes a received signal strength indicator for measuring a signal strength of the received signal. The system further includes a signal strength tracker for tracking a variation with time of the signal strength of the received signal and converting the variation with time into a second unique identifier. The system further includes a comparator for comparing the received first unique identifier and the tracked and converted second unique identifier and for outputting a signal indicating the result of the comparison. The user is authenticated if the signal indicates that the first and second identifiers correlate correctly.

15 Claims, 2 Drawing Sheets

(51) Int. Cl.
*G06F 21/30* (2013.01)
*G06F 3/01* (2006.01)

(58) Field of Classification Search
CPC ...... H04B 5/02; H04B 5/0012; H04B 5/0056; G06F 21/31; G06F 3/017; G06F 21/30; H04W 12/06
See application file for complete search history.

(56) References Cited

U.S. PATENT DOCUMENTS

| | | | |
|---|---|---|---|
| 8,117,445 B2 | 2/2012 | Werner et al. | |
| 8,200,582 B1* | 6/2012 | Zhu | G06Q 20/382 705/51 |
| 8,536,979 B2* | 9/2013 | Tsuyuzaki | G07C 9/00309 340/5.1 |
| 9,088,895 B2* | 7/2015 | Vincent et al. | |
| 9,140,599 B1* | 9/2015 | Beckman | G01H 1/003 |
| 2006/0085847 A1 | 4/2006 | Ikeuchi et al. | |
| 2006/0136997 A1* | 6/2006 | Telek | G01S 11/06 726/5 |
| 2007/0037527 A1* | 2/2007 | Poppa | 455/76 |
| 2007/0203850 A1* | 8/2007 | Singh | G06Q 20/327 705/67 |
| 2008/0001735 A1* | 1/2008 | Tran | G06F 19/3418 340/539.22 |
| 2008/0089311 A1* | 4/2008 | Roy | H04B 7/2612 370/345 |
| 2008/0103972 A1* | 5/2008 | Lanc | G06Q 20/32 705/44 |
| 2008/0235774 A1* | 9/2008 | Tsuyuzaki | G07C 9/00309 726/7 |
| 2009/0112765 A1* | 4/2009 | Skowronek | G06Q 20/32 705/44 |
| 2009/0137211 A1* | 5/2009 | Stengel et al. | 455/76 |
| 2010/0002803 A1 | 1/2010 | Murdoch et al. | |
| 2010/0082445 A1 | 4/2010 | Hodge et al. | |
| 2010/0093428 A1* | 4/2010 | Mattice et al. | 463/25 |
| 2010/0093429 A1* | 4/2010 | Mattice et al. | 463/25 |
| 2010/0215187 A1* | 8/2010 | Moosavi | H04R 27/00 381/82 |
| 2011/0028104 A1* | 2/2011 | Giombanco et al. | 455/78 |
| 2011/0076941 A1* | 3/2011 | Taveau | G06Q 10/10 455/41.1 |
| 2011/0087454 A1* | 4/2011 | Lee | G06F 3/017 702/124 |
| 2011/0201270 A1* | 8/2011 | Perkins et al. | 455/41.1 |
| 2011/0251955 A1 | 10/2011 | Lam | |
| 2012/0064828 A1 | 3/2012 | Khan et al. | |
| 2012/0064844 A1* | 3/2012 | Miyashita et al. | 455/84 |
| 2012/0124662 A1* | 5/2012 | Baca | G06F 21/32 726/17 |
| 2012/0214416 A1* | 8/2012 | Kent | H04L 63/18 455/41.2 |
| 2012/0252359 A1* | 10/2012 | Adams | G06Q 20/3572 455/41.1 |
| 2012/0254031 A1* | 10/2012 | Walker | G06Q 20/3278 705/42 |
| 2013/0176115 A1* | 7/2013 | Puleston et al. | 340/10.51 |
| 2014/0187148 A1* | 7/2014 | Taite et al. | 455/41.1 |
| 2014/0366130 A1* | 12/2014 | Ikemoto | G06F 1/1694 726/19 |

* cited by examiner

AUTHENTICATION FOR NEAR FIELD COMMUNICATIONS

PRIORITY

This application claims priority to Great Britain Patent Application No. 1208604.7, filed 16 May 2012, and all the benefits accruing therefrom under 35 U.S.C. §119, the contents of which in its entirety are herein incorporated by reference.

BACKGROUND

The present invention relates generally to security in near field communication devices, and in particular to authentication for near field communications (NFC).

NFC is currently being adopted as a form of payment technology by both banks and retailers to allow quick payment for products and services with a small associated value. This form of payment technology provides a quick and easy mechanism for payments to be made using a contactless method through both traditional debit/credit cards and through mobile devices such as phones.

NFC is a set of short-range wireless technologies, typically operating over a distance of ten centimeters (cm) or less between two NFC-compatible devices. NFC operates at 13.56 megahertz (MHz) and transfers data at data rates ranging from 106 kilobits per second (kbit/s) to 424 kbit/s. When two NFC-compatible devices are brought within about four cms of one another, such as by a wave or a touch, an NFC connection is established which can then be used to transfer information and/or keys.

NFC typically involves an initiator and a target; the initiator actively generating a radio frequency (RF) field that can power a passive target. This enables NFC targets to take very simple form factors such as tags, stickers, key fobs, or debit/credit cards that do not require batteries. They can also be integral to or attached to mobile devices such as phones.

The quick and easy mechanism of establishing a connection by means of a wave or a touch however means that there is a compromise in security as no form of personal identification number (PIN) is required in order to authorize the transaction. While payments without the entry of a PIN are typically limited to a low value, in the case of a device such as a credit card being lost or stolen a number of smaller transactions can still be performed causing expense for either the customer or the payment provider.

SUMMARY

Embodiments include methods, computer program products, and systems for use in a near field communications system for authenticating at a near field communications receiver, a user of a near field communications transmitter. The system includes a data receiver for receiving a signal comprising a first unique identifier from a near field communications transmitter. The system also includes a received signal strength indicator for measuring a signal strength of the received signal. The system further includes a signal strength tracker for tracking a variation with time of the signal strength of the received signal and converting the variation with time into a second unique identifier. The system further includes a comparator for comparing the received first unique identifier and the tracked and converted second unique identifier and for outputting a signal indicating the result of the comparison. The user is authenticated if the signal indicates that the first and second identifiers correlate correctly.

BRIEF DESCRIPTION OF THE SEVERAL VIEWS OF THE DRAWINGS

Embodiments of the present invention will now be described in more detail, by way of example only, with reference to the accompanying drawings, in which.

DETAILED DESCRIPTION

Embodiments of the present invention are directed to using a near field communications system for authenticating, at a near field communications receiver, a user of a near field communications transmitter. A process may include receiving a signal that includes a first unique identifier from a near field communications transmitter and measuring the signal strength of the received signal. A variation with time of the signal strength of the received signal may be tracked and the variation with time converted into a second unique identifier. The received first unique identifier is compared with the second unique identifier and a signal is output that indicates the result of the comparison. The user is authenticated if the signal indicates that the first and second unique identifiers correlate correctly.

In an embodiment, the variation with time of the signal strength of the received signal is associated with a predetermined pattern of movement of the near field communications transmitter closer to and further from the near field communications receiver. The use of a predetermined pattern of movement as a personalised form of authentication has the advantage of providing a level of security that is absent from conventional near field communications devices. This level of security can be implemented in currently available technology and provides a minimal impact to the usability of a near field communications system. Alternatives, such as the use of a personal identification number (PIN) may impact the usability of the near field communications system.

In an embodiment, the data receiver receives packets of data and the signal strength of the received signal is measured after receipt of each of the packets of data.

Further, the signal indicating the result of the comparison may be used to determine the outcome of a transaction. Yet further, after a plurality of results indicating that the first unique identifier and the second unique identifier are different, the transaction may be denied.

Figure 1:
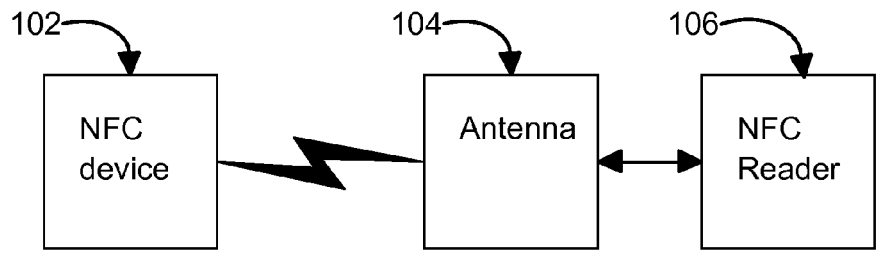
FIG. 1 shows a block diagram of an NFC device, antenna and reader in which embodiments of the present invention may be implemented.

Referring to FIG. 1, a near field communication (NFC) reader 106 is connected to an appropriate antenna 104. That connection may be through a suitable matching network. The NFC reader 106 transmits a signal through an antenna 104 that is received by an NFC device 102 when it is within range. The range at which communications between the NFC reader 106 and the NFC device 102 can be ensured is dependent on many factors including the diagonal dimension of the antenna used. Typically an antenna may be four centimeters (cm) by three cm, giving a diagonal dimension of five cm and a read range of ten cm. Other antenna dimensions and shapes can be used and the read range may be greater than ten cm or less than ten cm.

Embodiments provide an enhanced form of security through an NFC system by using variation in signal strength as a personalized form of security, and in particular, authentication.

When a user brings an NFC device 102 close to an NFC reader 106 the user varies the signal strength by moving the NFC device 102 closer to and further from the receiver in a predetermined pattern known to the user. This predetermined pattern has previously been stored in the NFC device 102. The pattern may be encoded in any number of ways before storage in the NFC device 102. The pattern may include, for example, the NFC device 102 moving in and out of range for communication with the NFC reader 106 and the length of time that the NFC device 102 spends within range for communication with the NFC reader 106.

An example pattern might be giving three short taps of the NFC device 102 against the NFC reader 106 followed by a two second hold of the NFC device 102 against the NFC reader 106. This could, for example, be in range for 0.2 seconds, out of range for 0.2 seconds, in range for 0.2 seconds, out of range for 0.2 seconds, in range for 0.2 seconds, out of range for 0.2 seconds, followed by in range for two seconds.

An example embodiment may be calibrated to allow a certain amount of variation in the length of time in range, out of range and held in range time. It may also be calibrated for the ranges of signal strength that are used for in and out of range to ensure the correct tolerance for matching security credentials.

Figure 2:
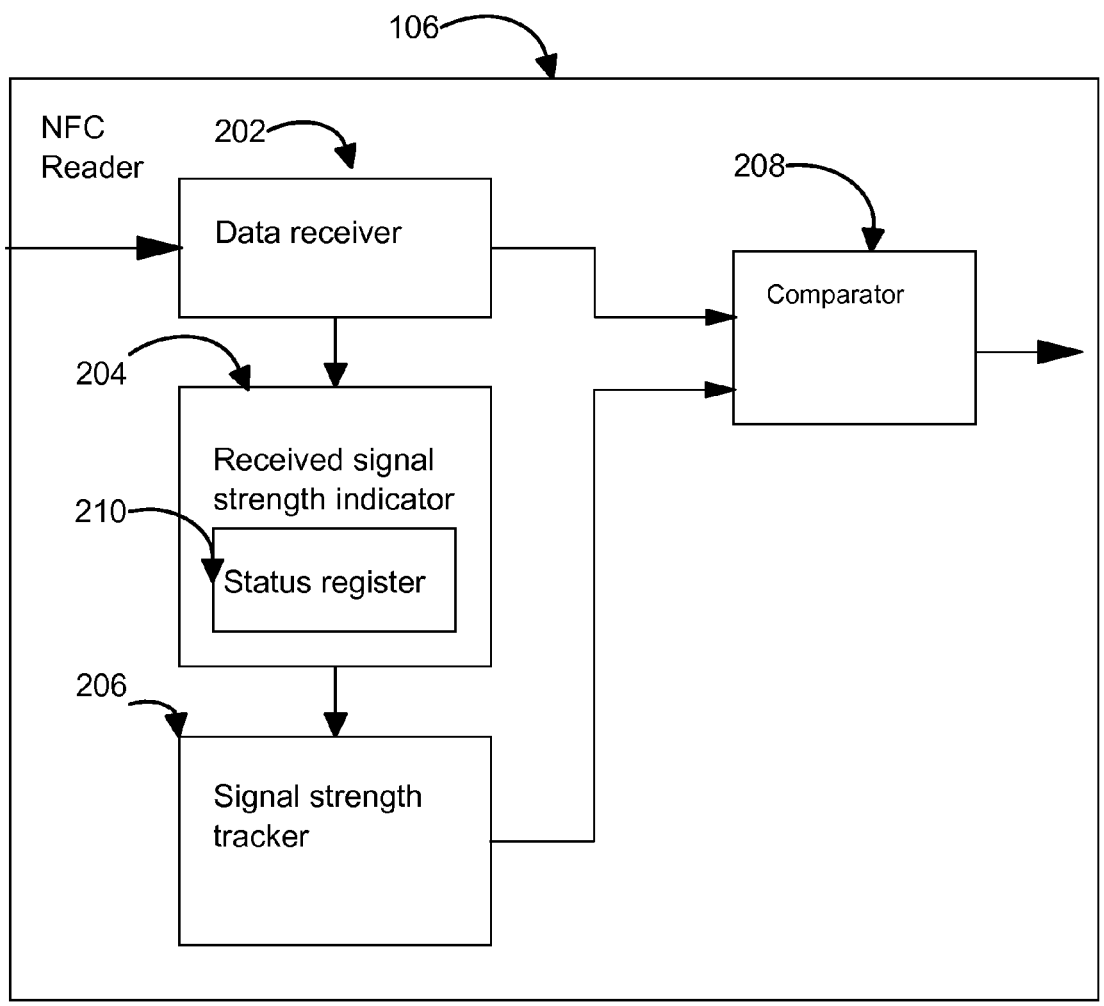
FIG. 2 shows a block diagram of portions of the reader of FIG. 1 used in embodiments of the present invention.

FIG. 2 shows a block diagram of portions of an NFC reader 106. The NFC reader 106 will be described with reference to an embodiment using a TRF7960 integrated circuit from Texas Instruments Incorporated. Other embodiments of the invention may be implemented using components from other manufacturers. These other embodiments may or may not require circuitry external to an integrated circuit, such as a received signal strength indicator, in order to function as embodiments of the present invention.

Figure 4:
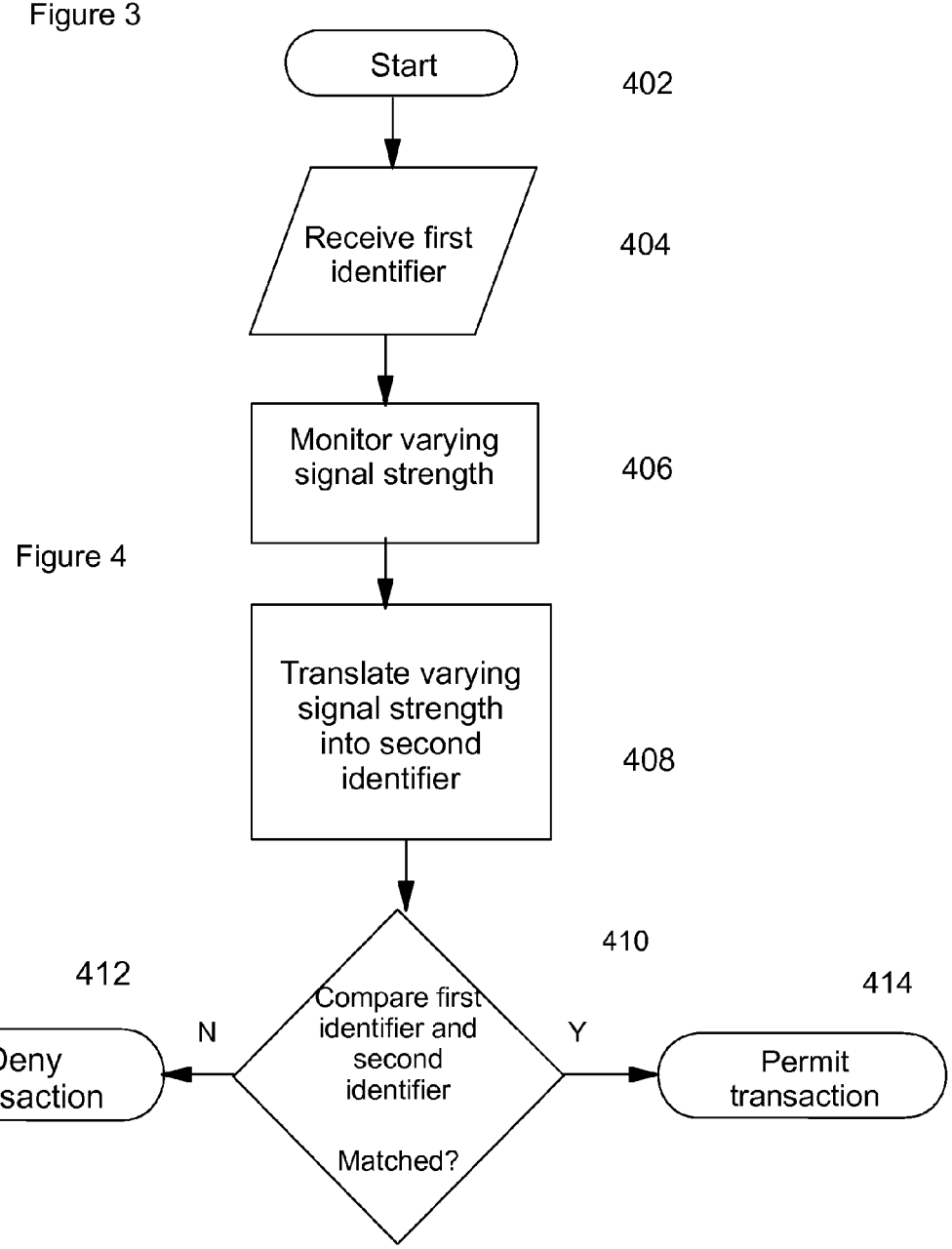
FIG. 4 shows a flow diagram of an embodiment of the present invention.

In an embodiment, data receiver 202 receives (block 404 in FIG. 4) a signal from an NFC device (e.g., NFC device 102 in FIG. 1) through an antenna (e.g., antenna 104 in FIG. 1) and extracts digital data from the signal to form a first unique identifier that uniquely identifies the individual NFC device 102. This first unique identifier may be extracted from the signal using conventional protocols. This first unique identifier may be passed to comparator 208 which compares it with a second unique identifier passed from the signal strength tracker 206 described below. In an embodiment, comparator 208 compares the first and second unique identifiers and outputs a signal indicating the result of the comparison that is whether the two unique identifiers are the same or differ from each other. The comparison may take many forms, but in the present embodiment, it is assumed that a multi-bit digital value is compared to another multi-bit digital value. As mentioned above, the comparison may allow a certain amount of variation in the length of time in range, out of range and held in range time.

Data receiver 202 also passes a signal to received signal strength indicator 204. This measures (block 406 in FIG. 4) the amplitude of the signal received by the data receiver 202. This measurement can be made, for example, after receiving each packet. Alternatively, the measurement could be made less frequently or more frequently. In an embodiment, the levels are placed in the status register 210 in the received signal strength indicator 204. In an embodiment implementation using the TRF7960 integrated circuit, there are two separate data receivers 202, one using phase modulation (PM) and one using amplitude modulation (AM). In normal operation, the main receiver uses AM and the auxiliary receiver uses PM, but this can be reversed.

Figure 3:
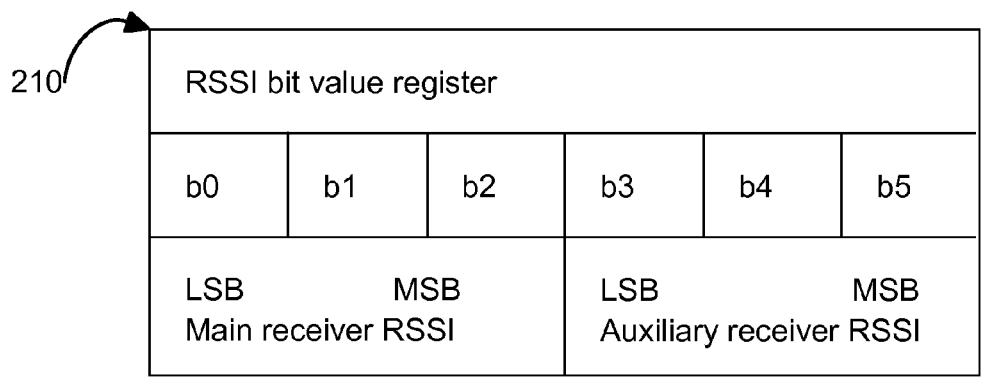
FIG. 3 shows an exemplary status register of the reader of FIG. 2.

Referring to FIG. 3, the status register 210 has three bits of data for each of the main receiver and the auxiliary receiver. In an embodiment, the levels from 1 to 7 correspond to Decibel (db) increments between levels. For example, levels 1 to 7 may be 2 millivolts peak-to-peak (mVpp), 3.2 mVpp, 5 mVpp, 8 mVpp, 13 mVpp, 20 mVpp and 32 mVpp. For example, for the main receiver, if $b2=1$, $b1=1$ and $b0=0$, then the received signal strength indicator (RSSI) value is six, which corresponds to 20 mVpp.

Signal tracker 206 tracks the contents of the status register 210 and converts (at block 408 in FIG. 4) the varying values of the received signal into a second unique identifier. In an embodiment, the signal strength when, for example, the earlier referred to sequence of in range for 0.2 seconds, out of range for 0.2 seconds, in range for 0.2 seconds, out of range for 0.2 seconds, in range for 0.2 seconds, out of range for 0.2 seconds, followed by in range for two seconds could result in status register values of 5, 0, 5, 0, 5, 0, 7. These status register values could be used directly as the second unique identifier or they could be transformed to say 1, 2, 1, 2, 1, 2, 0, where a high signal strength is stored as 0, a medium signal strength is stored as 1 and a low signal strength or no signal is stored as 2. As will be obvious to a person skilled in the art, other encoding schemes could also be used.

The signal strength tracker 206 passes the second unique identifier to comparator 208 which compares it with the first unique identifier passed from the data receiver 202 described above. As described above, comparator 208 compares (block 410 in FIG. 4) the first and second unique identifiers and outputs a signal indicating the result of the comparison that is whether the two unique identifiers are the same or differ from each other. As mentioned above, the comparison may allow a certain amount of variation in the length of time in range, out of range and held in range time.

If there is a match between the first unique identifier and the second unique identifier, then this can be an indication that the user of the NFC device 102 is an authorised user. If there is no match between the first unique identifier and the second unique identifier, then this can be an indication that the user of the NFC device 102 is not an authorised user. If the NFC reader 106 is being used in the course of a transaction, then the transaction can be approved (Block 414 in FIG. 4) or denied (block 412 in FIG. 4) according to whether the user is an authorized user or not.

In a further embodiment, continued authentication failure may result in the suspension of the service of using the NFC device 102 in association with transactions. Such suspension may also be determined by scoring how close the user providing the second unique identifier was to matching the first unique identifier stored in the NFC device 102, meaning that a near miss may not be counted as an authentication failure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for use in a near field communications system for authenticating, at a near field communications receiver, a user of a near field communications transmitter, the system comprising:
 a receiver device comprising a first data receiver and a second data receiver, each configured to receive a signal comprising a first unique identifier from a near field communications transmitter, the first unique identifier indicating a predetermined pattern of movement of the near field communications transmitter, the predetermined pattern of movement specifying a pattern of movement in and out of range of the near field communications receiver and a length of time that the near field communications transmitter spends within range for communication with the near field communications receiver;
 a received signal strength indicator configured to measure a signal strength of the received signal and to store the signal strength in a status register as one of three or more discrete levels;

a signal strength tracker configured to track a variation with time of the signal strength of the received signal and to convert the variation with time into a second unique identifier that indicates an actual pattern of movement of the near field communications transmitter; and a comparator configured to compare the received first unique identifier and the second unique identifier and to output a signal indicating the result of said comparison, wherein the user is authenticated if the signal indicating the result of said comparison indicates that the first unique identifier matches the second unique identifier.

2. A system as claimed in claim 1, wherein the signal received by the receiver device includes packets of data and the signal strength of the received signal is measured after receipt of each of the packets of data.

3. A system as claimed in claim 1, wherein the signal indicating the result of the comparison is used to determine the outcome of a transaction.

4. A system as claimed in claim 3, wherein after a plurality of results indicating that the first unique identifier and the second unique identifier are different, the transaction is denied.

5. A system as claimed in claim 1, wherein the signal strength is stored in the status register as one of seven discrete levels.

6. A method for use in a near field communications system for authenticating, at a near field communications receiver, a user of a near field communications transmitter, the method comprising:

receiving, at a receiver device that includes a first data receiver and a second data receiver, a signal comprising a first unique identifier from a near field communications transmitter, the first unique identifier indicating a predetermined pattern of movement of the near field communications transmitter, the predetermined pattern of movement specifying a pattern of movement in and out of range of the near field communications receiver and a length of time that the near field communications transmitter spends within range for communication with the near field communications receiver, the first data receiver using phase modulation and the second data receiver using amplitude modulation;

measuring a signal strength of the received signal and storing the signal strength in a status register as one of three or more discrete levels;

tracking a variation with time of the signal strength of the received signal and converting the variation with time into a second unique identifier that indicates an actual pattern of movement of the near field communications transmitter;

comparing the received first unique identifier and the second unique identifier and outputting a signal indicating the result of the comparison; and authenticating the user if the signal indicating the result of said comparison indicates that the first unique identifier matches the second unique identifier.

7. A method as claimed in claim 6, wherein the signal received by the receiver device receives packets of data and the signal strength of the received signal is measured after receipt of each of the packets of data.

8. A method as claimed in claim 6, wherein the signal indicating the result of the comparison is used to determine the outcome of a transaction.

9. A method as claimed in claim 8, wherein after a plurality of results indicating that the first unique identifier and the second unique identifier are different, then transaction is denied.

10. A method as claimed in claim 6, wherein the signal strength is stored in the status register as one of seven discrete levels.

11. A computer program product for use in a near field communications system for authenticating, at a near field communications receiver, a user of a near field communications transmitter, the computer program product comprising:

a non-transitory computer readable storage medium having computer readable program code embodied therewith, the computer readable program code comprising:

computer readable program code configured for:

receiving, at a receiver device that includes a first data receiver and a second data receiver, a signal comprising a first unique identifier from a near field communications transmitter, the first unique identifier indicating a predetermined pattern of movement of the near field communications transmitter, the predetermined pattern of movement specifying a pattern of movement in and out of range of the near field communications receiver and a length of time that the near field communications transmitter spends within range for communication with the near field communications receiver, the first data receiver using phase modulation and the second data receiver using amplitude modulation;

measuring a signal strength of the received signal and storing the signal strength in a status register as one of three or more discrete levels;

tracking a variation with time of the signal strength of the received signal and converting the variation with time into a second unique identifier that indicates an actual pattern of movement of the near field communications transmitter;

comparing the received first unique identifier and the second unique identifier and outputting a signal indicating the result of the comparison; and authenticating the user if the signal indicating the result of said comparison indicates that the first unique identifier matches the second unique identifier.

12. A computer program product as claimed in claim 11, wherein the signal received by the receiver device receives packets of data and the signal strength of the received signal is measured after receipt of each of the packets of data.

13. A computer program product as claimed in claim 11, wherein the signal indicating the result of the comparison is used to determine the outcome of a transaction.

14. A computer program product as claimed in claim 13, wherein after a plurality of results indicating that the first unique identifier and the second unique identifier are different, the transaction is denied.

15. A computer program product as claimed in claim 13, wherein the signal strength is stored in the status register as one of seven discrete levels.

* * * * *